United States Patent
Ahn et al.

(10) Patent No.: US 11,333,745 B2
(45) Date of Patent: *May 17, 2022

(54) LIDAR INTEGRATED LAMP APPARATUS OF VEHICLE

(71) Applicants: Hyundai Motor Company, Seoul (KR); Kia Motors Corporation, Seoul (KR)

(72) Inventors: Byoung Suk Ahn, Gwacheon-si (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

This patent is subject to a terminal disclaimer.

(21) Appl. No.: 16/585,383

(22) Filed: Sep. 27, 2019

(65) Prior Publication Data

US 2020/0341120 A1    Oct. 29, 2020

(30) Foreign Application Priority Data

Apr. 25, 2019 (KR) .................. 10-2019-0048507

(51) Int. Cl.
| | | |
|---|---|---|
| *F21S 41/20* | (2018.01) | |
| *G01S 7/481* | (2006.01) | |
| *F21S 41/176* | (2018.01) | |
| *G01S 17/08* | (2006.01) | |
| *F21S 41/16* | (2018.01) | |
| *F21S 41/32* | (2018.01) | |
| *F21S 41/25* | (2018.01) | |
| *F21W 102/13* | (2018.01) | |

(52) U.S. Cl.
CPC ............. *G01S 7/4814* (2013.01); *F21S 41/16* (2018.01); *F21S 41/176* (2018.01); *F21S 41/25* (2018.01); *F21S 41/285* (2018.01); *F21S 41/32* (2018.01); *G01S 17/08* (2013.01); *F21W 2102/13* (2018.01)

(58) Field of Classification Search
None
See application file for complete search history.

(56) References Cited

U.S. PATENT DOCUMENTS 9,285,477 B1    3/2016 Smith et al.

FOREIGN PATENT DOCUMENTS

KR    10-2009-0096994 A    9/2009

*Primary Examiner* — Elmito Breval
(74) *Attorney, Agent, or Firm* — Morgan, Lewis & Bockius LLP (57) ABSTRACT

In the Light Detection and Ranging (LIDAR) integrated lamp apparatus of a vehicle, an application location for a head lamp and an application location for a ladder are configured in the same space, with the result that layout is reduced and the cost reduction due to reduction of the number of the associated portions is achieved by sharing and combining components.

16 Claims, 11 Drawing Sheets

LIDAR INTEGRATED LAMP APPARATUS OF VEHICLE

CROSS-REFERENCE(S) TO RELATED APPLICATIONS

The present application claims priority to Korean Patent Application No. 10-2019-0048507, filed on Apr. 25, 2019, the entire contents of which is incorporated herein for all purposes by this reference.

BACKGROUND OF THE DISCLOSURE

Field of the Disclosure

Embodiments of the present invention relates to a lidar integrated lamp apparatus of a vehicle, which is configured to allow functions of both a head lamp and a lidar to be implemented in one space.

Description of Related Art

In general, vehicles are provided with lighting systems for making it possible to observe objects in a traveling direction at night and notifying another vehicles or pedestrians of a traveling state of the vehicle. A head lamp, also referred to as a headlight, is a lighting lamp that functions to illuminate the course ahead of the vehicle.

Furthermore, in recent years, an autonomous vehicle is provided with a Light Detection and Ranging (LIDAR) for implementing its autonomous traveling, which is configured to detect a distance between the vehicle and a target by irradiating a laser beam and measuring a time period during which the laser beam is transmitted from a sensor to the target and then received from the target.

A position for mounting such a lidar in the vehicle is approximate to that for mounting the head lamp. However, it is required to secure an installation space for each of the head lamp and the lidar because they are installed at different positions. Furthermore, since the head lamp and the lidar are required to be installed separately, the space and components required to install them is increased. Moreover, there is a problem that if optimum installation positions for the head lamp and the lidar are the same, they are required to be changed in spite of loss of the function of any one thereof.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lidar integrated lamp apparatus of a vehicle, in which an application location for a head lamp and an application location for a lidar are configured in the same space such that a layout thereof is reduced.

In accordance with one aspect of the present invention for accomplishing the object as mentioned above, there may be provided a lidar integrated lamp apparatus of a vehicle including: a first light source for irradiating light for forming a beam pattern; a second light source spaced from the first light source and configured to irradiate light for being detected by a lidar, which is directed to have a superimposition point on a traveling path of the light for forming the beam pattern; a reflection unit provided between the first light source and the second light source and configured to turn traveling paths of the light for forming the beam pattern and the light for being detected by the lidar, which are incident from different directions, such that one of the light for forming the beam pattern and the light for being detected by the lidar is directed forward and in turn to the outside of the vehicle and the other is directed backward thereof; and a reflection mirror provided behind the reflection unit and configured to turn the light for forming the beam pattern or the light for being detected by the lidar, which are directed backward by the reflection unit, to again direct forward and in turn to the outside of the vehicle.

The apparatus may further include a light receiving unit of receiving the light for being detected by the lidar, which is emitted to the outside of the vehicle and then reflected from an object and changing the received light into an electric signal.

The reflection unit may be provided with a reflection mirror configured to rotate by 360 degrees about a rotation axis thereof such that a tilt angle of the reflection mirror is changed when a driving signal is input so that irradiation angles of the light for forming the beam pattern and the light for being detected by the lidar are changed depending on the tilt angle of the reflection mirror.

The apparatus may further include a control unit connected to the first and second light sources and of controlling the first and second light sources to be selectively turned on wherein the control unit is configured to preset a zone of an irradiation angle of a lamp and a zone of an irradiation angle of the lidar according to a tilt angle of the reflection mirror and control the first light source to be turned on when the tilt angle of the reflection mirror is within the zone of the irradiation angle of the lamp and the second light source to be turned on when the tilt angle of the reflection mirror is within the zone of the irradiation angle of the lidar.

The control unit may be configured to, for the zone of the irradiation angle of the lamp, set a dark region generation angle corresponding to a dark region for preventing the light for forming the beam pattern from being irradiated when the dark region is generated such that the first light source is turned off at the dark region generation angle.

The first light source and the second light source may be spaced from each other at opposite sides with respect to the reflection unit wherein the first light source is spaced from the second light source with an installation angle maintained upward or downward with respect to a connection line between the second source and the reflection unit.

When the first light source is located at a higher level compared to the second light source, the reflection mirror may be located at a lower level compared to the reflection unit and spaced from the reflection unit with an installation angle maintained with respect to an optical axis of the light for being detected by lidar, which is directed forward by the reflection unit.

The reflection mirror may be provided to be inclined by a half of the installation angle from an imaginary vertical line.

The apparatus may further include a first optical system provided in front of the reflection mirror to allow the light for forming the beam pattern reflected from the reflection mirror to be incident and allow the incident light for forming the beam pattern to project to the outside of the vehicle.

The first optical system may include a diffusion lens for a beam pattern to diffuse the light for forming a beam pattern, a phosphor for changing color of the light for forming a beam pattern, and an image forming lens for forming a beam pattern and emitting the light to the outside.

The phosphor may be configured such that a plurality of opaque partition walls extending in a linear shape as viewed on a cross section of the phosphor are spaced from each other.

The apparatus may further include a second optical system provided in front of the reflection unit to allow the light for being detected by the lidar, which is reflected from the reflection unit, to diffuse and project to the outside of the vehicle.

The second optical system may include a first diffusion lens for horizontally diffusing the light for being detected by the lidar, which is reflected and directed from the reflection unit, and a second diffusion lens for vertically diffusing the light for being detected by the lidar, which is diffused horizontally by the first diffusion lens.

The first light source and the second light source are spaced from each other at opposite sides with respect to the reflection unit wherein when the second light source is spaced from the first light source with an installation angle maintained forward with respect to a connection line between the first light source and the reflection unit, the second optical system is spaced by a predetermined angle from the reflection unit.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lidar integrated lamp apparatus of a vehicle according to exemplary embodiments of the present invention will now be described in detail with reference to the accompanying drawings.

Figure 1:
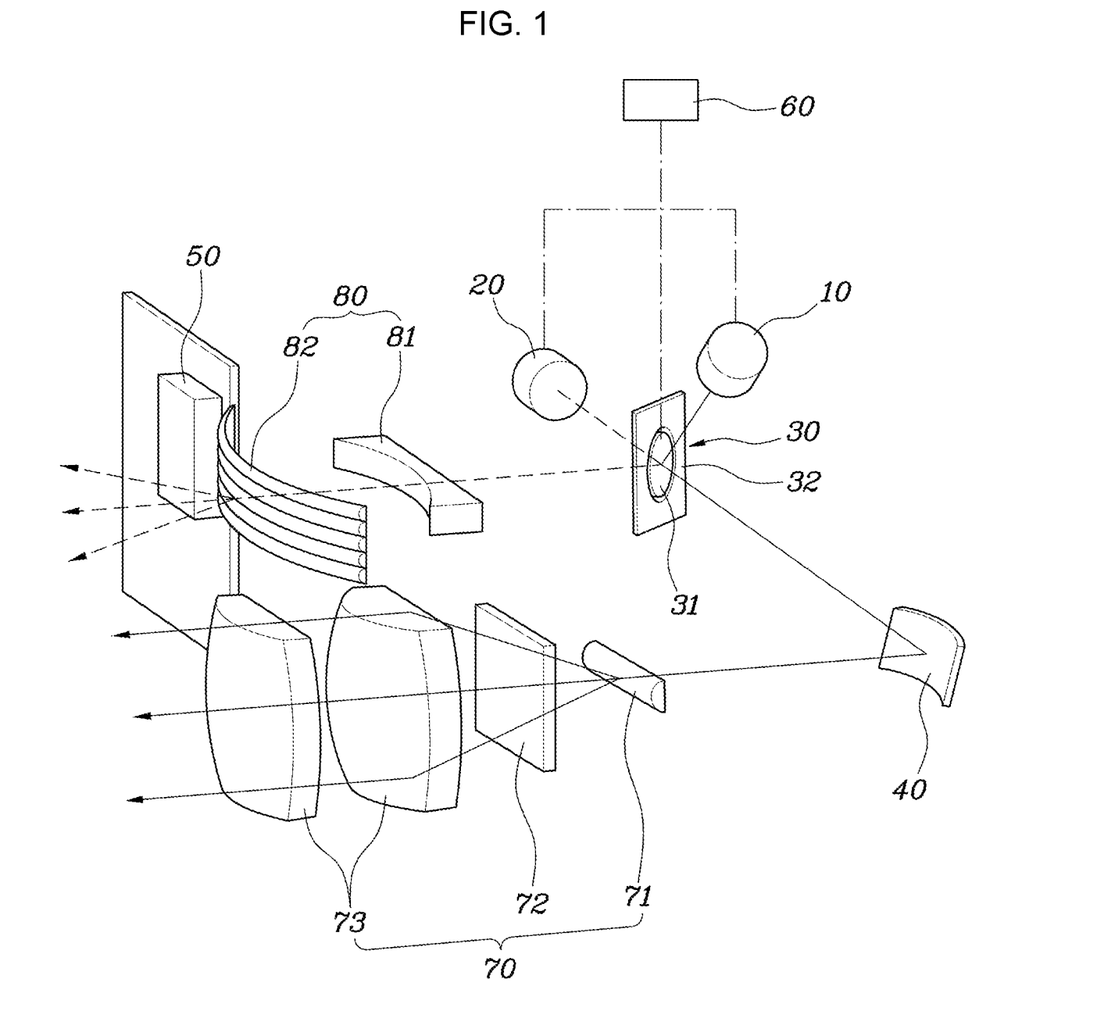
FIG. 1 is a view exemplarily illustrating a lidar integrated lamp apparatus of a vehicle, according to an exemplary embodiment of the present invention.
Figure 2:
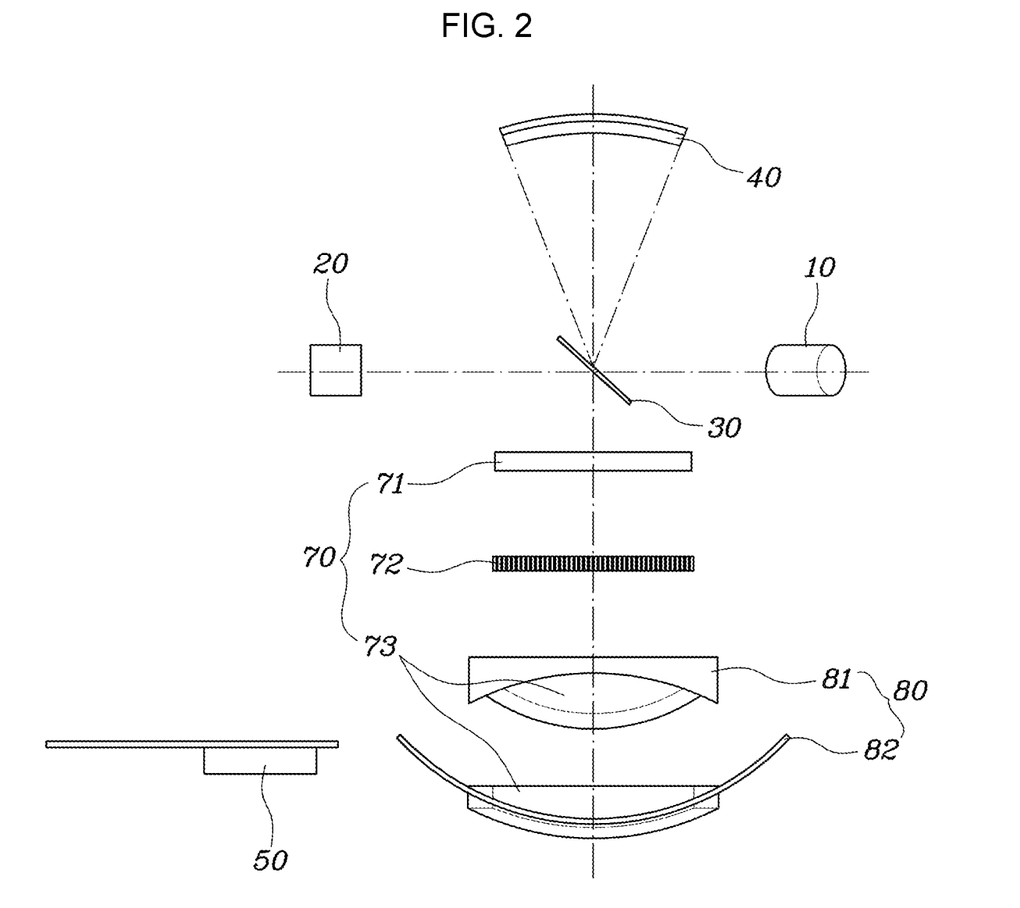
FIG. 2, FIG. 3, FIG. 4 and FIG. 5 are views for illustrating the lidar integrated lamp apparatus of a vehicle as shown in FIG. 1.
Figure 5:
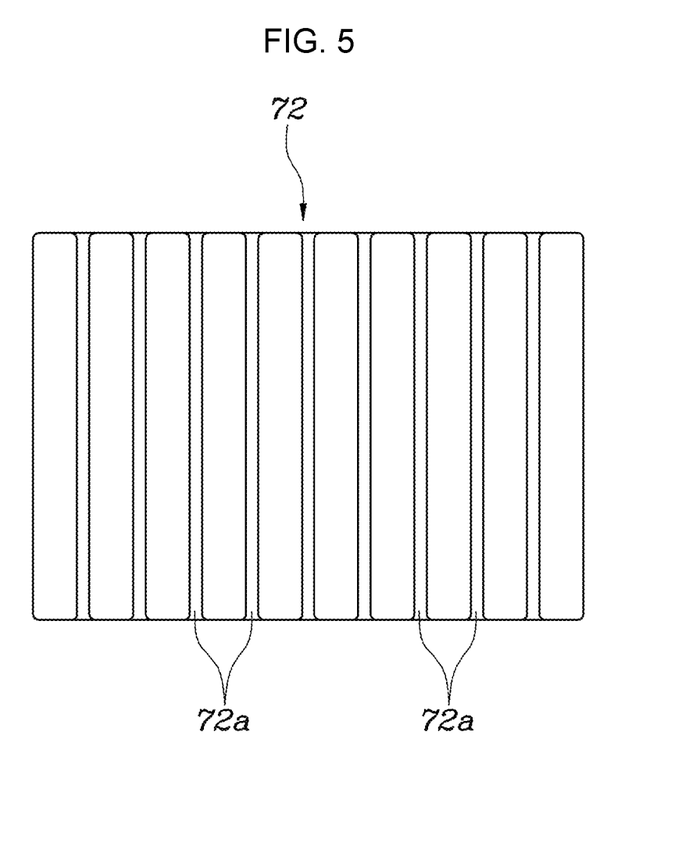
Figure 6:
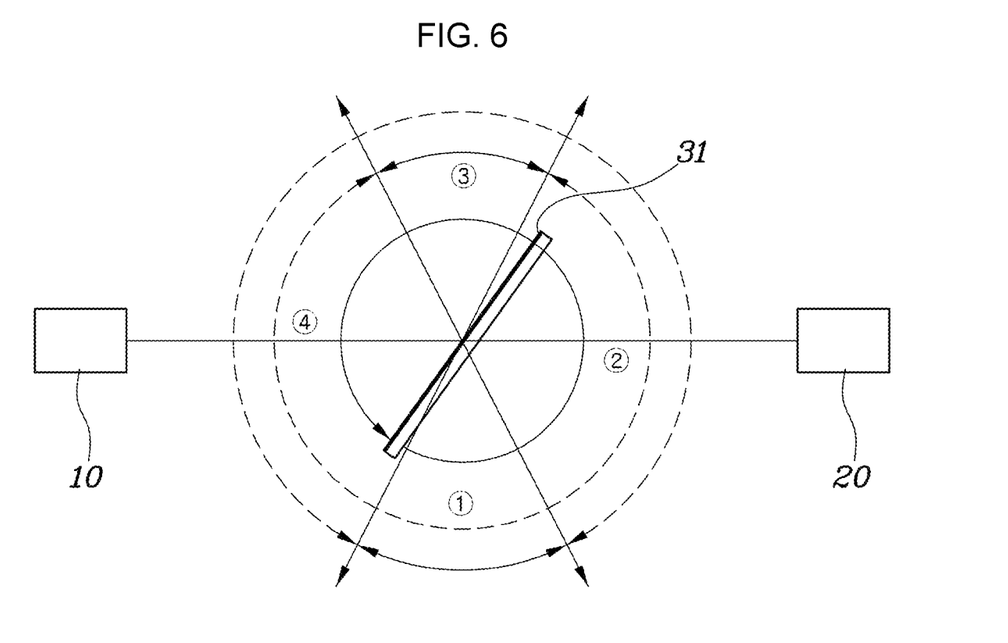
FIG. 6, FIG. 7, and FIG. 8 are views for illustrating control of light sources in a lidar integrated lamp apparatus of a vehicle, according to an exemplary embodiment of the present invention.
Figure 7:
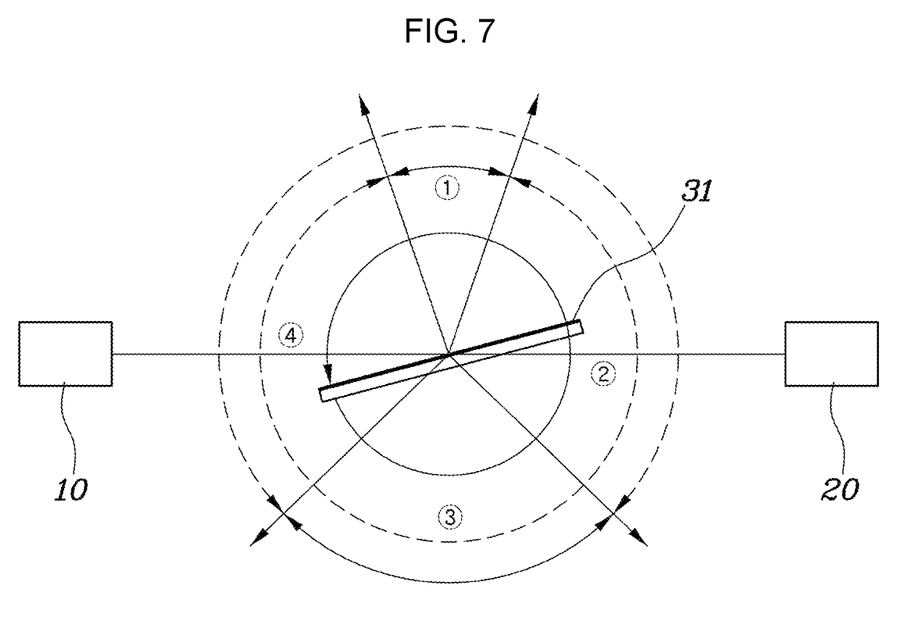
Figure 8:
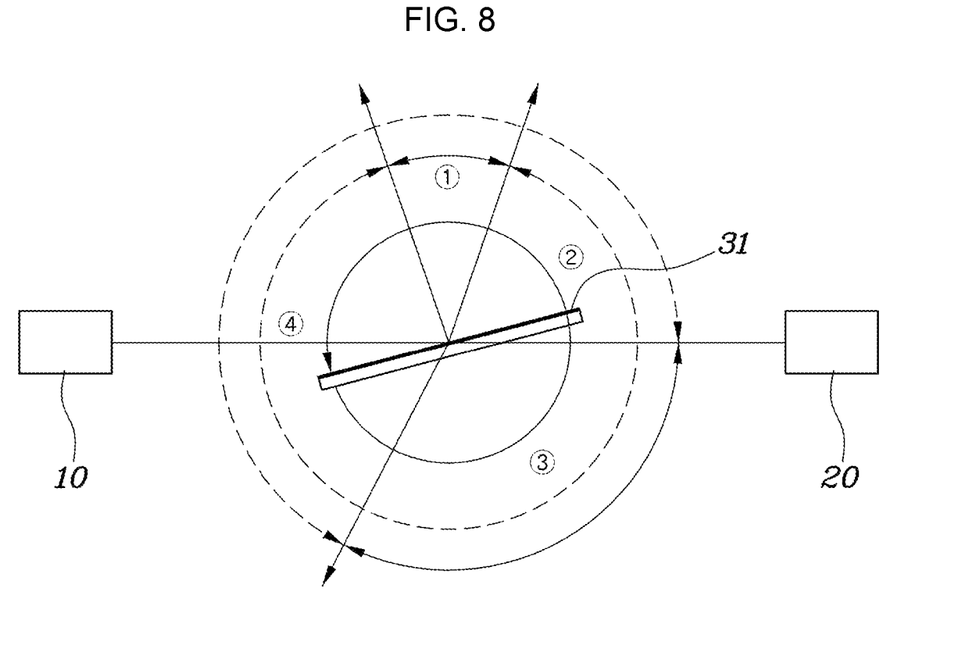
Figure 9:
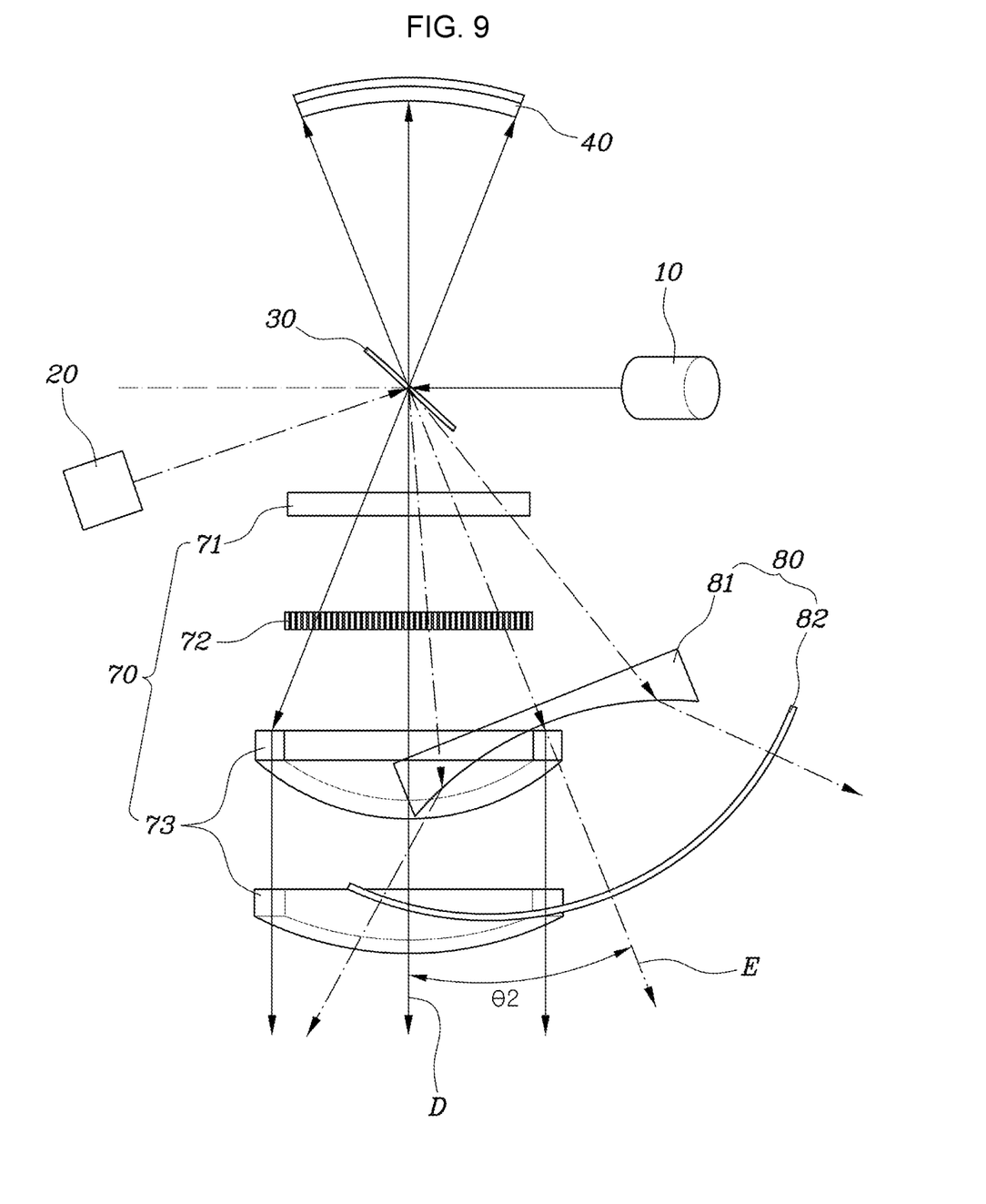
FIG. 9 is a view exemplarily illustrating a lidar integrated lamp apparatus of a vehicle, according to various exemplary embodiments of the present invention.
Figure 10:
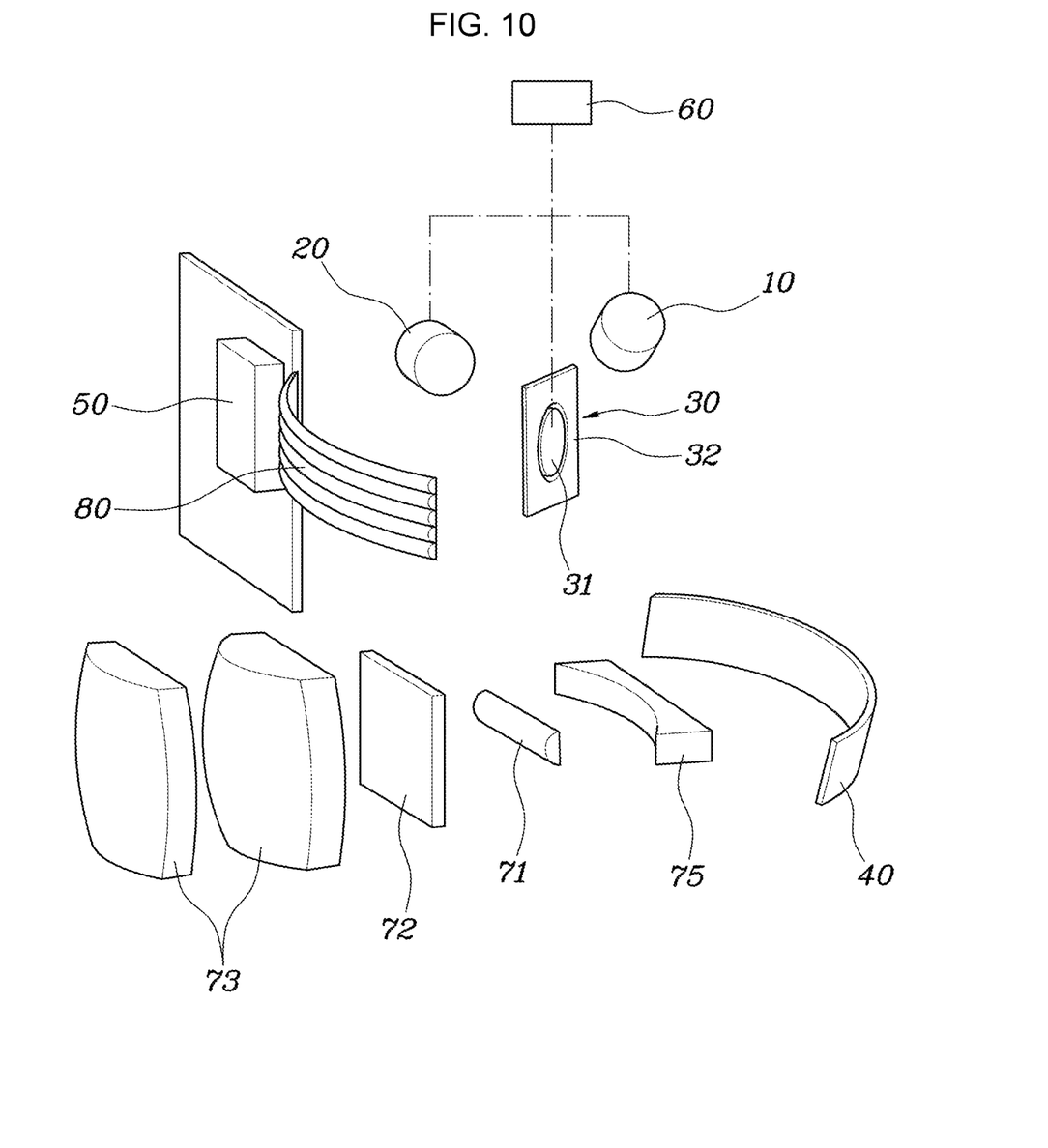
FIG. 10, and FIG. 11 are views illustrating a lidar integrated lamp apparatus of a vehicle, according to a yet another exemplary embodiment of the present invention.
Figure 11:
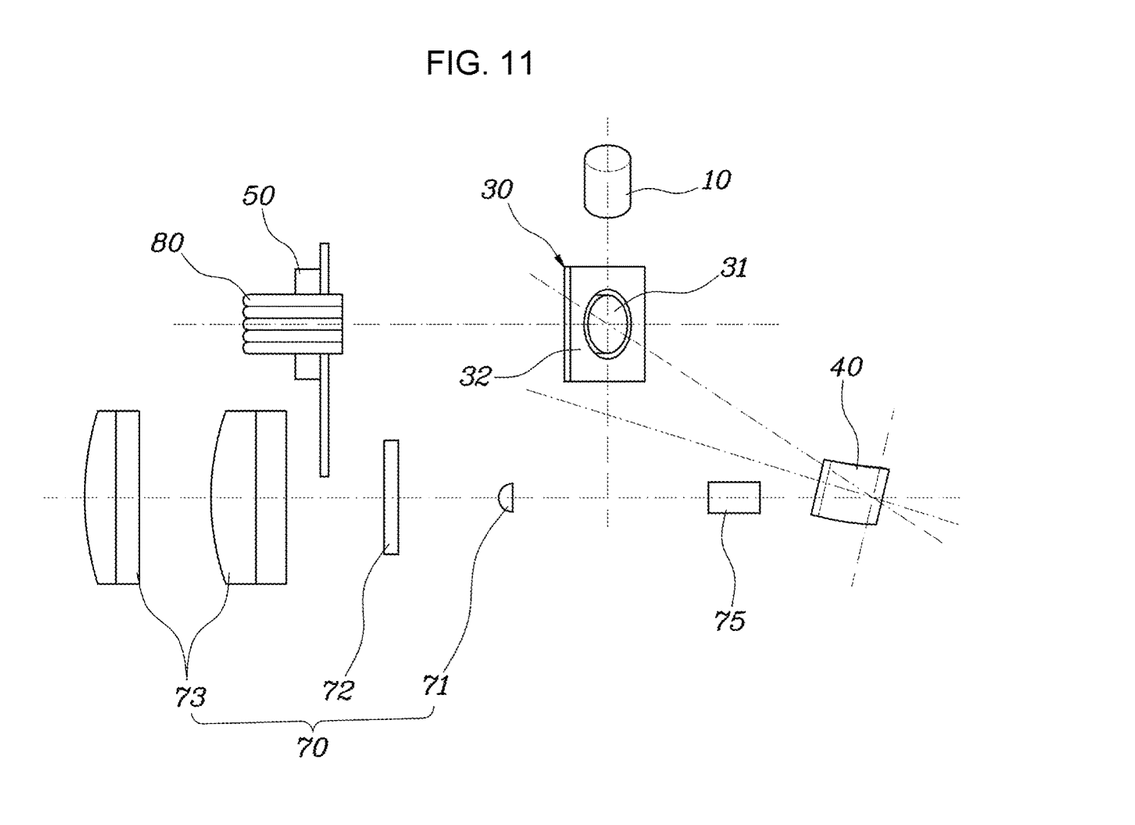

FIG. 1 is a view exemplarily illustrating a lidar integrated lamp apparatus of a vehicle, according to an exemplary embodiment of the present invention; FIG. 2, FIG. 3, FIG. 4 and FIG. 5 are views for illustrating the lidar integrated lamp apparatus of a vehicle as shown in FIG. 1; FIG. 6, FIG. 7, and FIG. 8 are views for illustrating control of light sources in a lidar integrated lamp apparatus of a vehicle, according to an exemplary embodiment of the present invention; FIG. 9 is a view exemplarily illustrating a lidar integrated lamp apparatus of a vehicle, according to various exemplary embodiments of the present invention; and FIG. 10, and FIG. 11 are views illustrating a lidar integrated lamp apparatus of a vehicle, according to a yet another exemplary embodiment of the present invention.

As shown in FIGS. 1 to 4, a lidar integrated lamp apparatus of a vehicle according to an exemplary embodiment of the present invention includes: a first light source 10 for irradiating light for forming a beam pattern; a second light source 20 spaced from the first light source 10 and configured to irradiate light for being detected by a lidar, which is directed to have a superimposition point on a traveling path of the light for forming the beam pattern; a reflection unit 30 provided between the first light source 10 and the second light source 20 and configured to turn traveling paths of the light for forming the beam pattern and the light for being detected by the lidar, which are incident from different directions, such that one of the light for forming the beam pattern and the light for being detected by the lidar is directed forward and in turn to the outside of the vehicle and the other is directed backward thereof; and a reflection mirror 40 provided behind the reflection unit 30 and configured to turn the light for forming the beam pattern or the light for being detected by the lidar, which are directed backward by the reflection unit 30, to again direct forward and in turn to the outside of the vehicle.

In the instant case, the apparatus may further include a light receiving unit 50 for receiving the light for being detected by the lidar, which is emitted to the outside of the vehicle and then reflected from an object and changing the received light into an electric signal.

Furthermore, the apparatus may further include a first optical system 70 provided in front of the reflection mirror 40 to allow the light for forming the beam pattern reflected from the reflection mirror 40 to be incident and allow the incident light for forming the beam pattern to project to the outside of the vehicle. Moreover, the apparatus may further include a second optical system 80 provided in front of the reflection unit 30 to allow the light for being detected by the lidar, which is reflected from the reflection unit 30, to diffuse and project to the outside of the vehicle.

As described above, the present exemplary embodiment includes the first light source 10, the second light source 20, the reflection unit 30 and the reflection mirror 40 and each of these components is provided in one installation space to implement functions of both the head lamp and the lidar therein. To the present end, as an exemplary embodiment of the present invention, the light for forming the beam pattern, which is irradiated from the first light source 10, is turned to direct to the outside of the vehicle through the reflection unit 30, the reflection mirror 40 and a first optical system 70, while the light for being detected by the lidar, which is irradiated from the second light source 20, is turned to direct to the outside of the vehicle through the reflection unit 30 and a second optical system 80 and then reflected from an object and returned to a light receiving unit 50 so that distance between the vehicle and the object may be identified.

To the present end, the first light source 10 is configured to irradiate laser beam wherein a wavelength band of the laser beam is set to fall within a wavelength band of visible light such that light for forming the beam pattern may be projected onto the road surface on which the vehicle is traveling. On the other hand, the second light source 20 is configured to irradiate infrared ray having a wavelength band of the order of 905 nm such that light for being detected by the lidar may be irradiated to detect the distance between the object and the vehicle is irradiated.

The light for forming the beam pattern and the light for being detected by the lidar, which are irradiated from the first light source 10 and the second light source 20 respectively, are incident onto the reflection unit 30. In the instant case, the reflection unit 30 is provided with a reflection mirror 31 configured to rotate by 360 degrees about a rotation axis thereof such that a tilt angle of the reflection mirror is changed when a driving signal is input so that irradiation angles of the light for forming the beam pattern and the light for being detected by the lidar are changed depending on the tilt angle of the reflection mirror 31. In other words, the reflection unit 30 is provided with a reflection mirror 31 for reflecting light. The reflection mirror 31 may be composed of a mirror. The reflection mirror 31 is configured to rotate 360 degrees to change the traveling path of the light for forming the beam pattern and the light for being detected by the lidar and in turn irradiation angles of the light. In the instant case, since the reflection unit 30 is mounted between the first light source 10 and the second light source 20, the light for forming the beam pattern and the light for being detected by the lidar are incident from different paths, and travelling paths of the light for forming the beam pattern and the light for being detected by the lidar, which are reflected from the reflection mirror 31, are turned to direct opposite directions on which they do not overlap with each other. In the present exemplary embodiment of the reflection unit 30, a casing 32 in which the reflection mirror 31 is mounted may be configured to be inclined so as not to interfere with the traveling paths of the light and mounted at an upper or lower end portion of the reflection mirror 31.

In an exemplary embodiment of the present invention, an actuator is connected to the reflection mirror 31 and the tilt angle of the reflection mirror 31 is changed when a driving signal is input to the actuator.

In the present way, the traveling path of the light for forming the beam pattern, which is reflected through the reflection unit 30, is turned by the reflection mirror 40 to project to the outside of the vehicle, while the traveling path of the light for being detected by the lidar is turned by the reflection unit 30 to project to the outside of the vehicle. The reflection mirror 40 is configured to have a curved surface with respect to the center portion of the reflection mirror 31 such that the light for forming the beam pattern, which is incident on the reflection mirror, is directed to be condensed in the first optical system 70. Furthermore, length of the reflection mirror is set depending on an irradiation angle of the light for forming the beam pattern according to a tilt angle of the reflection mirror 31.

Here, the light for forming the beam pattern from the first light source 10 may be changed into visible light configured for illuminating the road surface by being passed through the first optical system 70. The first optical system 70 may include a diffusion lens 71 for a beam pattern to diffuse the light for forming a beam pattern, a phosphor 72 for changing color of the light for forming a beam pattern, and an image forming lens 73 for forming a beam pattern and emitting the light to the outside. As a result, the light for forming the beam pattern may be diffused in its horizontal directional angle by the reflection unit 30 and diffused vertically by the diffusion lens 71 for the beam pattern, changed into a specific color by the phosphor 72 and then projected onto the road surface outside the vehicle through the image forming lens 73.

In the instant case, it is possible to configure such that the first light source 10 irradiates a blue laser as the light for forming the beam pattern and the light is changed into white light when passing through the phosphor 72. Furthermore, as shown in FIG. 5, the phosphor 72 may be configured such that a plurality of opaque partition walls 72a extending in a linear shape as viewed on a cross section of the phosphor are spaced from each other so that the light for forming the beam pattern passing through the phosphor 72 is restricted from spreading by the structure of the opaque partition walls 72a and thus a desired beam pattern may be formed.

On the other hand, the light for being detected by the lidar from the second light source 20 is directed forward by the reflection unit 30 and then reflected from an object in front of the vehicle and returned to the vehicle. In the instant case, the second optical system 80 is provided in front of the reflection unit 30. The second optical system 80 may include a first diffusion lens 81 for horizontally diffusing the light for being detected by the lidar, which is reflected and directed from the reflection unit 30, and a second diffusion lens 82 for vertically diffusing the light for being detected by the lidar, which is diffused horizontally by the first diffusion lens 81. The first diffusion lens 81 may be a concave lens and may be configured to diffuse the light for being detected by the lidar, which is widened horizontally by the reflection unit 30, more extensively in the horizontal direction thereof. The second diffusion lens 82 may be a convex lens and configured to diffuse the light for being detected by the lidar, which is diffused horizontally by the first diffusion lens 81, in the vertical direction so that the light for being detected by the lidar is diffused extensively outside the vehicle to detect the object clearly.

In the present way, the light for being detected by the lidar, which is projected to the outside of the vehicle through the second optical system 80, is reflected and returned from the object and received by the light receiving unit 50 where it is changed into an electric signal to measure distance between the vehicle and the object and the like. The light receiving unit 50 may be a scanner for recognizing the light for being detected by the lidar and may detect the light for being detected by the lidar through a photodiode and change it into an electric signal.

As described above, the exemplary embodiment of the present invention in various aspects of the present invention, the lidar is mounted together in the space for mounting the head lamp in the vehicle, so that a separate space for mounting the lidar is reduced and the cost is reduced as the number of the associated portions is reduced.

It will be apparent to those skilled in the art that the reflection mirror 40, the first optical system 70 and the second optical system 80 may be mounted reversely depending on traveling paths of the light for forming the beam pattern and the light for being detected by the lidar, of which traveling paths are turned by the arrangement of the first light source 10 and the second light source 20 and the reflection mirror 31 and that various modifications and variations may be made in the exemplary embodiments described below.

On the other hand, the present exemplary embodiment of the present invention may further include a control unit 60 to control the reflection mirror 31 and an on/off state of the first and second light sources 10 and 20. In the instant case, the control unit 60 may be implemented by a non-volatile memory configured to store an algorithm constructed to control operation of various components of the vehicle or data related to software commands for playing the algorithm as well as a processor configured to perform operation described below by use of the data stored in the memory. In the instant case, the memory and the processor may be implemented as separate chips. Alternatively, the memory and the processor may be implemented as a single chip in which they are integrated. The processor may be constructed in a form of one or more processors.

The control unit 60 may be configured to preset a zone of an irradiation angle of a lamp and a zone of an irradiation angle of the lidar according to the tilt angle 31 and control the first light source 10 to be turned on when the tilt angle of the reflection mirror 31 is within the zone of the irradiation angle of the lamp and the second light source 20 to be turned on when the tilt angle of the reflection mirror 31 is within the zone of the irradiation angle of the lidar.

In other words, since the reflection mirror 31 of the reflection unit 30 may be rotated 360 degrees, a zone of an irradiation angle of the lamp and a zone of an irradiation angle of the lidar, which depend on the tilt angle of the reflection mirror 31, may be preset in the control unit 60 such that the light for forming the beam pattern and the light for being detected by the lidar may be irradiated only within a desired irradiation angle by controlling the ON/OFF states of the first light source 10 and the second light source 20.

For example, as shown in FIG. 6, assuming that the zone of the irradiation angle of the lamp and the zone of the irradiation angle of the lidar in the region where light is reflected according to the tilt angle of the reflection mirror 31 are indicated by a zone ① and a zone ③, respectively, the control unit may be configured to turn on the first light source 10 when the irradiation angle of the light for forming the beam pattern according to the tilt angle of the reflection mirror 31 comes into the zone ① which is the predetermined zone of the irradiation angle of the lamp; turn on the second light source 20 when the irradiation angle of the light for being detected by the lidar according to the tilt angle of the reflection mirror 31 comes into the zone ③ which is the predetermined zone of the irradiation angle of the lidar; and turn off both the first light source 10 and the second light source 20 when the irradiation angle of the light for forming the beam pattern and the irradiation angle of the light for being detected by the lidar according to the tilt angle of the reflection mirror 31 come into the zones ② and ④ respectively. As a result, when the light for beam pattern and the light for lidar detecting are reflected by the reflecting mirror 31, they are limited to specific zones respectively whereby the traveling paths thereof are determined so that the light can travel at the irradiation angle determined.

The zone of the irradiation angle of the lamp and the zone of the irradiation angle of the lidar may be set in various manners. For example, it is possible to secure the zone of the irradiation angle of the lidar more extensively to eliminate a separate lens for diffusing the horizontal angle, as shown in FIG. 7. Furthermore, as shown in FIG. 8, the zone of the irradiation angle of the lidar may be enlarged laterally so that the detecting range of the lidar is extended to the side as well as the front of the vehicle, with the result that detection of objects around the vehicle is performed smoothly.

On the other hand, the control unit 60 may be configured to, for the zone of the irradiation angle of the lamp, set a dark region generation angle corresponding to a dark region for preventing the light for forming the beam pattern from being irradiated when the dark region is generated such that the first light source 10 is turned off at the dark region generation angle. In other words, in the situation where a vehicle is coming to the front of the vehicle, when generating the dark region for the vehicle coming to the vehicle, the control unit 60 may be configured to set a dark region generation angle corresponding to the dark region and control the first light source 10 to be turned off at the dark region generation angle so that the dark region is formed.

Figure 3:
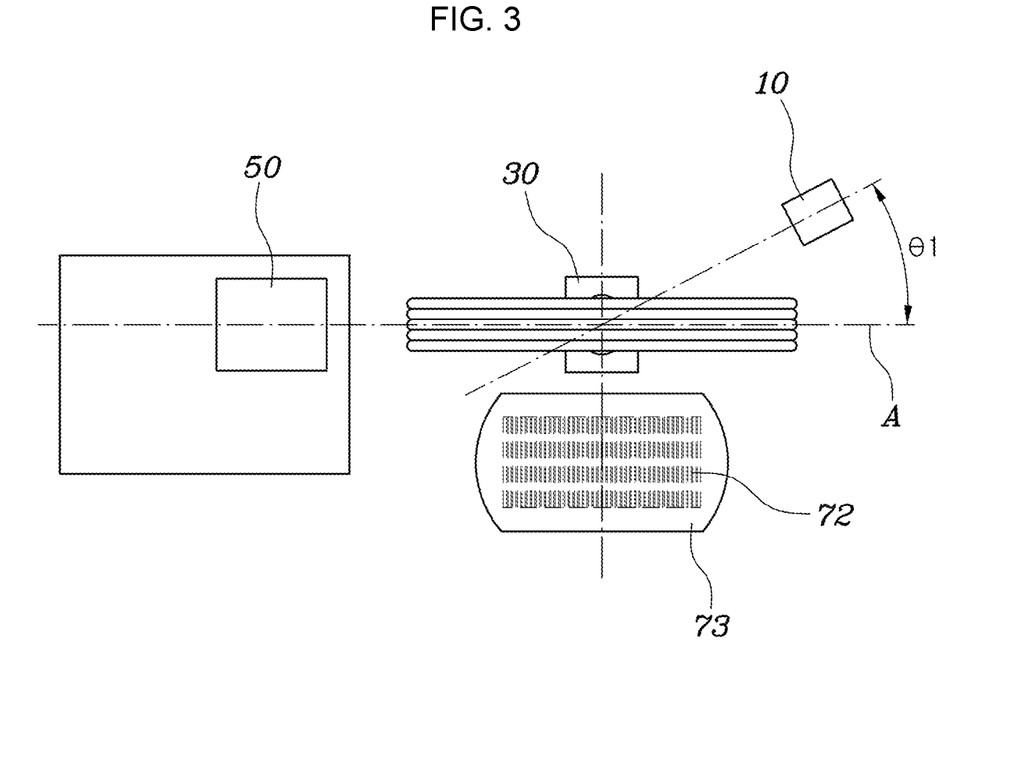
Figure 4:
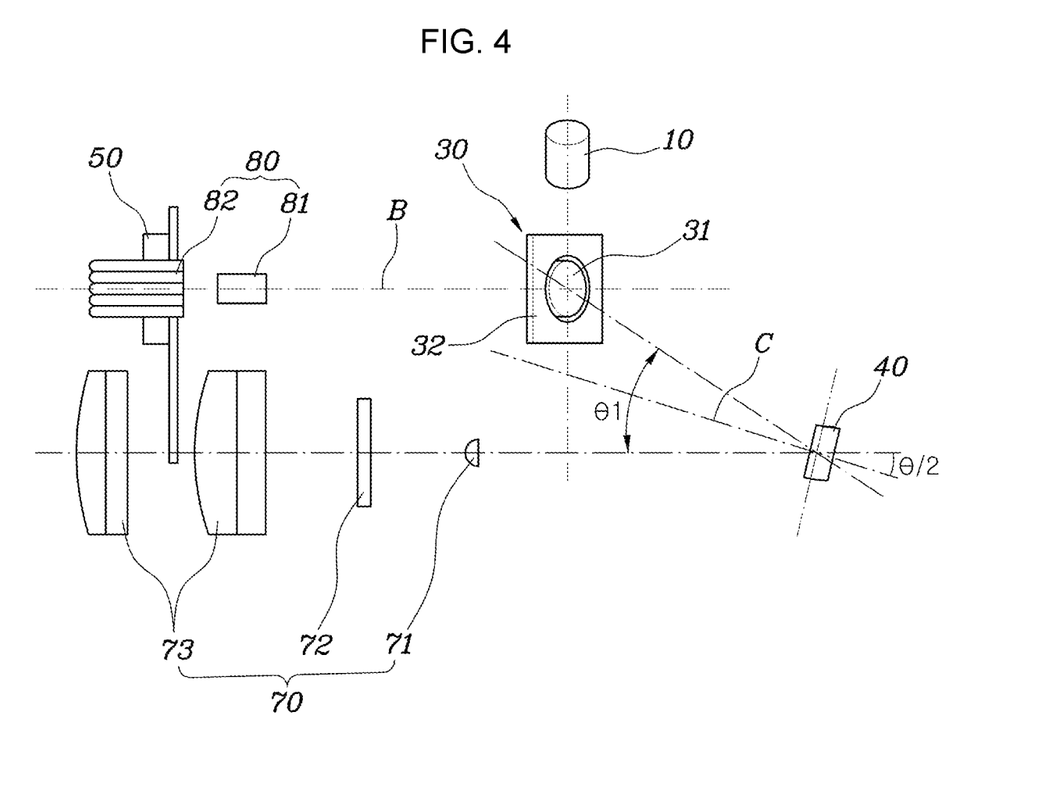

As shown in FIG. 3 and FIG. 4, the first light source 10 and the second light source 20 are spaced from each other at opposite sides with respect to the reflection unit 30 wherein the first light source 10 is spaced from the second light source with an installation angle $\theta 1$ maintained upward or downward with respect to a connection line between the second source 20 and the reflection unit 30.

As an exemplary embodiment of the present invention, the first light source 10 may be mounted with an installation angle $\theta 1$ maintained upwards from the second light source 20 so that the light for forming the beam pattern irradiated from the first light source 10 is directed downward and directed toward the reflection mirror 40 after it is reflected from the reflection unit 30 while the light for being detected by the lidar, which is irradiated from the second light source 20, is directed forward after it is reflected from the reflection unit 30, as may be seen from FIG. 1. Accordingly, the reflection mirror 40 and the first optical system 70 may be mounted at a lower level compared to the reflection unit 30 while the second optical system 80 may be mounted in front of the reflection unit 30.

As a result, the light for forming the beam pattern from the first light source 10 and the light for being detected by the lidar from the second light source 20 are directed in different traveling paths when they are reflected from the reflection unit 30, so that superimposition of lights is avoided.

As shown in FIGS. 1 and 4, when the first light source 10 is located at a higher level compared to the second light source 20, the reflection mirror 40 is located at a lower level compared to the reflection unit 30 and spaced from the reflection unit with an installation angle $\theta 1$ maintained with respect to an optical axis B of the light for being detected by lidar, which is directed forward by the reflection unit 30. In other words, since the first light source 10 is mounted with the installation angle $\theta 1$ maintained at the higher level compared to the reflection unit 30 so that the light for forming the beam pattern is directed downward when it is reflected from the reflection unit 30, in case where the reflection mirror 40 is spaced with the installation angle $\theta 1$ from the reflecting unit 30, the reflection mirror 40 can are configured to turn the light for forming the beam pattern because the reflection mirror is mounted on the traveling path of the light for forming the beam pattern, which is irradiated from the first light source 10 and then reflected from the reflection unit 30.

On the other hand, as shown in FIG. 4, the reflection mirror 40 may be provided to be inclined by a half of the installation angle θ1 from an imaginary vertical line C.

In other words, since the reflection unit 30 is configured to be inclined at the installation angle θ1 and the reflection mirror 40 is provided such that the imaginary vertical line C thereof is inclined by a half of the installation angle θ1, the light for forming the beam pattern reflected from the reflection unit 30 and directed to the reflection mirror may be turned to the horizontal direction by the reflection mirror 40 so that the optical axis of the light for forming the beam pattern passes through the first optical system 70 and is directed to the outside of the vehicle.

By setting the disposition location and the installation angle θ1 of the reflection mirror 40 depending on variation of the installation angle θ1 of the first light source 10 and the second light source 20, optical axes of the light for forming the beam pattern from the first light source 10 and the light for being detected by the lidar from the second light source 20 may be directed forward separately.

On the other hand, in another exemplary embodiment of the present invention as shown in FIG. 9, the first light source 10 and the second light source 20 are spaced from each other at opposite sides with respect to the reflection unit 30 and wherein when the second light source 20 is spaced from the first light source with an installation angle maintained forward with respect to a connection line A between the first light source 10 and the reflection unit 30, the second optical system 80 is spaced by a predetermined angle θ2 from the reflection unit 30.

Accordingly, the light beam for forming the beam pattern from the first light source 10 may be controlled to direct forward as the optical axis D is directed forward, while the light for being detected by the lidar from the second light source 20 may be controlled such that the optical axis E is shifted forward and laterally by the predetermined angle θ2 between the first light source 10 and the second light source 20.

Therefore, as the lidar including the head lamp of the vehicle is mounted on the side of the vehicle, the detecting range of the lidar is extended to the side as well as the front of the vehicle, with the result that detection of objects around the vehicle is performed smoothly.

On the other hand, in a lidar integrated lamp apparatus of a vehicle according to various exemplary embodiments of the present invention, as shown in FIGS. 10 to 11, a diffusion portion 75 may be provided between the reflection mirror 40 and the phosphor 72 to horizontally expand then vertically diffuse the light for forming the beam pattern traveling through the reflection mirror 40 to match it to the area of the phosphor 72. Furthermore, in the case of the second optical system 80, this may be configured to have only the diffusion lens for vertically diffusing the light for being detected by the lidar to simplify the structure.

In the lidar integrated lamp apparatus of the vehicle constructed as described above, an application location for the head lamp and an application location for the ladder are configured in the same space, with the result that layout is reduced and the cost reduction due to reduction of the number of the associated portions are achieved by sharing and combining components.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Light Detection and Ranging (LIDAR) integrated lamp apparatus of a vehicle, the LIDAR integrated lamp apparatus comprising:
   a first light source for irradiating light for forming a beam pattern;
   a second light source spaced from the first light source and configured to irradiate light for being detected by a LIDAR, which is directed to have a superimposition point on a traveling path of the light for forming the beam pattern;
   a reflection unit mounted between the first light source and the second light source and configured to turn traveling paths of the light for forming the beam pattern and the light for being detected by the LIDAR, which are incident from different directions, such that one of the light for forming the beam pattern and the light for being detected by the LIDAR is directed in a first direction and in turn to an outside of the vehicle and another of the light for forming the beam pattern and the light for being detected by the LIDAR is directed in a second direction; and
   a first reflection mirror provided behind the reflection unit and configured to turn the light for forming the beam pattern or the light for being detected by the LIDAR, which are directed in the second direction by the reflection unit, to again direct in the first direction and in turn to the outside of the vehicle.

2. The LIDAR integrated lamp apparatus of claim 1, further including:
   a light receiving unit of receiving the light for being detected by the LIDAR, which is emitted to the outside of the vehicle and then reflected from an object and changing the received light into an electric signal.

3. The LIDAR integrated lamp apparatus of claim 1, wherein the reflection unit is provided with a second reflection mirror configured to rotate by 360 degrees about a rotation axis thereof such that a tilt angle of the second reflection mirror is changed when a driving signal is input so that irradiation angles of the light for forming the beam pattern and the light for being detected by the LIDAR are changed depending on the tilt angle of the second reflection mirror.

4. The LIDAR integrated lamp apparatus of claim 3, further including:

a control unit connected to an actuator of the second reflection mirror, the first light source, and the second light source and of controlling the first and second light sources to be selectively turned on, wherein the control unit is configured to preset a zone of an irradiation angle of a lamp and a zone of an irradiation angle of the LIDAR according to the tilt angle of the second reflection mirror and to control the first light source to be turned on when the tilt angle of the second reflection mirror is within the zone of the irradiation angle of the lamp and the second light source to be turned on when the tilt angle of the second reflection mirror is within the zone of the irradiation angle of the LIDAR.

5. The LIDAR integrated lamp apparatus of claim 4, wherein the control unit is configured to, for the zone of the irradiation angle of the lamp, set a dark region generation angle corresponding to a dark region for preventing the light for forming the beam pattern from being irradiated when the dark region is generated such that the first light source is turned off at the dark region generation angle.

6. The LIDAR integrated lamp apparatus of claim 1, wherein the first light source and the second light source are spaced from each other at opposite directions with respect to the reflection unit, and wherein the first light source is spaced from the second light source with an installation angle maintained upward or downward with respect to a connection line between the second source and the reflection unit.

7. The LIDAR integrated lamp apparatus of claim 6, wherein when the first light source is located at a higher level compared to the second light source, the first reflection mirror is located at a lower level compared to the reflection unit and spaced from the reflection unit with an installation angle maintained with respect to an optical axis of the light for being detected by LIDAR, which is directed in the first direction by the reflection unit.

8. The LIDAR integrated lamp apparatus of claim 6, wherein the first reflection mirror is provided to be inclined by a half of the installation angle from an imaginary vertical line.

9. The LIDAR integrated lamp apparatus of claim 1, further including:

a first optical system provided in a front of the first reflection mirror to allow the light for forming the beam pattern reflected from the first reflection mirror to be incident and allow the incident light for forming the beam pattern to project to the outside of the vehicle.

10. The LIDAR integrated lamp apparatus of claim 9, wherein the first optical system includes:

a diffusion lens for a beam pattern to diffuse the light for forming a beam pattern;

a phosphor for changing color of the light for forming the beam pattern; and an image forming lens for forming a beam pattern and emitting the light to the outside.

11. The LIDAR integrated lamp apparatus of claim 10, wherein the phosphor is configured such that a plurality of opaque partition walls extending in a linear shape as viewed on a cross section of the phosphor are spaced from each other.

12. The LIDAR integrated lamp apparatus of claim 10, wherein a diffusion portion is provided between the first reflection mirror and the diffusion lens.

13. The LIDAR integrated lamp apparatus of claim 1, further including:

a second optical system provided in a front of the reflection unit to allow the light for being detected by the LIDAR, which is reflected from the reflection unit, to diffuse and project to the outside of the vehicle.

14. The LIDAR integrated lamp apparatus of claim 13, wherein the second optical system includes:

a first diffusion lens for horizontally diffusing the light for being detected by the LIDAR, which is reflected and directed from the reflection unit; and a second diffusion lens for vertically diffusing the light for being detected by the LIDAR, which is diffused horizontally by the first diffusion lens.

15. The LIDAR integrated lamp apparatus of claim 13, wherein the first light source and the second light source are spaced from each other at opposite directions with respect to the reflection unit, and wherein when the second light source is spaced from the first light source with an installation angle maintained in the first direction with respect to a connection line between the first light source and the reflection unit, the second optical system is spaced by a predetermined angle from the reflection unit.

16. The LIDAR integrated lamp apparatus of claim 15, wherein the first diffusion lens is a concave lens and the second diffusion lens is a convex lens.

\* \* \* \* \*